US012746609B2

(12) United States Patent
Ljatifi et al.

(10) Patent No.: US 12,746,609 B2
(45) Date of Patent: Sep. 29, 2026

(54) TOOL FOR THE ROTARY AND CUTTING MACHINING OF WORKPIECES

(71) Applicant: KUNSTSTOFFWERK AG BUCHS, Buchs (CH)

(72) Inventors: Mehmed Ljatifi, Buchs (CH); Martin Rudolph, Nuziders (AT); Gion Andrea Barandun, Zurich (CH); Donat Schönenberger, St. Gallen (CH)

(73) Assignee: KUNSTSTOFFWERK AG BUCHS, Buchs (CH)

( * ) Notice: Subject to any disclaimer, the term of this patent is extended or adjusted under 35 U.S.C. 154(b) by 715 days.

(21) Appl. No.: 17/312,889

(22) PCT Filed: Dec. 11, 2019

(86) PCT No.: PCT/CH2019/050031

§ 371 (c)(1),
(2) Date: Jun. 10, 2021

(87) PCT Pub. No.: WO2020/118460

PCT Pub. Date: Jun. 18, 2020

(65) Prior Publication Data

US 2022/0023960 A1 Jan. 27, 2022

(30) Foreign Application Priority Data

Dec. 11, 2018 (CH) ...................................... 1524/18

(51) Int. Cl.

| | |
|---|---|
| ***B23C 5/22*** | (2006.01) |
| ***B23C 5/00*** | (2006.01) |
| ***B27G 13/00*** | (2006.01) |

(52) U.S. Cl.

CPC ................ *B23C 5/006* (2013.01); *B23C 5/22* (2013.01); *B27G 13/002* (2013.01); *B23C 2226/27* (2013.01); *B23C 2226/61* (2013.01)

(58) Field of Classification Search

CPC ...... B27G 13/10; B27G 13/002; B27G 13/00; B23C 2226/61; B23C 2226/37;

(Continued)

(56) References Cited

U.S. PATENT DOCUMENTS 2,325,746 A 8/1943 Curtis
2,357,088 A 8/1944 Curtis (Continued)

FOREIGN PATENT DOCUMENTS

DE 4009461 A1 3/1991
DE 19934125 A1 1/2001

(Continued)

*Primary Examiner* — Alan Snyder

(74) *Attorney, Agent, or Firm* — Morriss O'Bryant Compagni Cannon, PLLC

(57) ABSTRACT

A tool for the rotary and cutting machining of workpieces includes a plurality of blades arranged on the tool body and arranged in blade arrangements, and a securing element that secures the blade arrangements to the tool body so that the blades cannot detach from the tool body during operation. The tool body is produced from plastic. The blades are incorporated into the tool body and the securing element provides a securing strip that is incorporated into the tool body and partially encloses the blade arrangements.

18 Claims, 6 Drawing Sheets

(58) Field of Classification Search
CPC ..... B23C 2270/08; B23C 5/2295; B23C 5/22; B23C 5/20; B23C 5/006
See application file for complete search history.

(56) References Cited

U.S. PATENT DOCUMENTS

| | | | | |
|---|---|---|---|---|
| 5,232,316 | A | 8/1993 | Tennutti | |
| 5,408,983 | A | 4/1995 | Sawluk | |
| 5,605,420 | A | 2/1997 | Feldsine | |
| 9,718,214 | B2 * | 8/2017 | Baratta .................. | B28D 1/121 |

FOREIGN PATENT DOCUMENTS

| | | | |
|---|---|---|---|
| DE | 10359854 | A1 | 7/2005 |
| DE | 102010036869 | A1 | 2/2012 |
| JP | H07103226 | A | 4/1995 |

* cited by examiner

TOOL FOR THE ROTARY AND CUTTING MACHINING OF WORKPIECES

CROSS-REFERENCE TO RELATED APPLICATIONS

This application is a national phase entry under 37 U.S.C § 371 of PCT/CH2019/050031 filed Dec. 11, 2019, which claims priority to Swiss Patent Application No. 01524/18 filed Dec. 11, 2018, the entirety of each of which is incorporated by this reference.

TECHNICAL FIELD OF THE INVENTION

The invention relates to a tool for rotary and cutting machining of workpieces.

BACKGROUND OF THE INVENTION

Tools for rotary and cutting machining of workpieces, in particular those made of wood or plastic, are usually made of metal, in particular steel. The manufacture of these workpieces is expensive, since they must be made of stainless steel with high precision. To accommodate the blades, the tool body can be provided with groove-shaped accommodations with undercuts, in which the blades can be clamped by means of a clamping part. To prevent the blades from flying off during operation, positively-locked connections are usually provided between the tool body and the blades.

TASK

One of the tasks of the present invention is to provide a tool for rotary and cutting machining of workpieces which can be manufactured inexpensively with the necessary degree of precision. Another task is to provide a tool that ensures safe operation at all times and minimizes the risk and scope of an accident due to material damage when operating the tool.

SUMMARY

The invention relates to a tool for rotary and cutting machining of workpieces, comprising a tool body having a plurality of blades arranged on the tool body in blade arrangements. The blades are arranged on the circumference of the tool body and project from it in the radial direction.

A solution of the task set forth is provided by a tool with the features indicated in the independent patent claims. Further embodiments and/or advantageous embodiment variants are the subject of the dependent patent claims.

According to the invention, the tool body is produced of plastic and the blades are incorporated in the tool body. In addition, a securing element in the form of a securing strip incorporated in the tool body is provided, which partially encloses the blade arrangements so that the blades cannot detach from the tool body during operation. The tool according to the invention has the advantage that it can be manufactured at low cost. Alternatively, the tool can be described as having a securing element in the form of a strip arranged to prevent the blades from being released after their connection to the tool body has been broken. When compared to a tool with detachable securing means for the blades, as are found in alternative tools, such a tool offers greater safety in the operation of a rotary tool since the securing element makes it impossible to lose the blade. The blade arrangements with the blades are retained, even after their attachment to the tool body has been disengaged, by means of the securing element, as in the tool according to the invention and still allow further operation of the tool without requiring its abrupt interruption.

Instead of incorporating the blade arrangement, the securing strip can also only partially incorporate the blades. This too ensures that the blades cannot become disengaged from the tool body during operation. In the event of the connection between a blade and the tool body coming undone, the blades are retained on the tool body, which also ensures the continued operation of the tool.

The connection between the blades and the tool body can be embodied as a positively-locked connection, whereby the blades are incorporated in the tool body.

Advantageously, the securing element is a strip enclosing the tool body in the circumferential direction. This makes it possible to achieve an even weight distribution over the circumference on the tool and a cost-effective manufacture of the securing element. At the same time, this shape enables the strip to better absorb the tensile forces in the circumferential direction.

In one embodiment of the invention, the strip as a securing element consists of a fiber composite material with a fiber content of at least 10%. The fibers can consist of glass, aramid or carbon. The advantage of using fiber composite material for the securing element is that the fiber composite materials can absorb very large tensile forces with a minimum self-weight. The securing element is intended to be loaded mainly by tensile forces.

The fibers of the fiber composite material can be present in the securing element in various forms, such as woven fabric, continuous fibers or unidirectional fibers oriented in the circumferential direction of the mold. When using a woven fabric as the structure of the fibers, an organic sheet is particularly advantageous. Due to its thermoplastic matrix, the organic sheet offers the advantage of hot formability, which can be utilized in the manufacture of the material connection between the securing element and the tool body.

In another embodiment of the invention, continuous fibers may be employed as fibers in the securing element. Due to their length, these fibers offer the possibility of wrapping the tool body in its circumferential direction.

In another embodiment of the invention, the fiber composite material has unidirectional fibers and is arranged so that these fibers are oriented in the circumferential direction of the tool. The securing element is arranged in such a way that it is predominantly subjected to tensile stress. The unidirectional fibers in the circumferential direction of the tool are pre-eminently suited for taking on the tensile forces acting in this direction.

In another embodiment of the invention, the securing element is implemented by wrapping the tool body by a continuous fiber. The continuous fibers are wound parallel to the broadside of the blades. This allows the continuous fiber to be laid close to the blades to provide for securing the blades with minimal use of continuous fibers.

In another embodiment of the invention, the blades are positively locked to the tool body. Advantageously, the blades are made of metal, in particular steel, but other materials are also conceivable. The attachment of the blades to the tool body is achieved either during manufacture by injection molding of the tool body around the blades or by fitting the blades in recesses which have been implemented by finishing the tool body after its manufacture and have the shape to form a positively-locked connection with the blades.

Each blade may have a slot through which the securing element is guided. This positively-locked connection secures the blades by the securing element. The slot is located along the broad side of the blade.

The tool body advantageously has an inner and outer ring, which are connected to each other by a plurality of ribs. The ribs ensure transmission of forces and torques from the inner to the outer ring and vice versa, and are themselves lightweight. This design of the components corresponds to a lightweight construction. The power required to operate a tool decreases sharply as its weight decreases.

The inner ring is designed as a hub. This enables the tool to be attached to a shaft which is meant to drive the tool.

When manufacturing the tool body, it should be noted that the inner and outer rings and the ribs in the tool body may have essentially the same wall thickness. This reduces the risk of imbalances on the tool, which in turn is of great importance for reliable operation of a rotary tool. Advantageously, the ribs in the tool body are oriented radially. This allows material and thus weight to be saved while maintaining functionality.

The securing element may be materially bonded to the tool body. Ideally, this material bond is achieved by using plastic both for the tool body and for the matrix of the composite material forming the securing element. After heating both components and reaching a certain material-specific temperature, a binding agent is formed on the surface between the components and a melting process occurs which bonds the two components together.

In another embodiment of the invention, the securing element is implemented by a metal grid. This has recesses in its grid structure for the blades in order to form a positively-locked connection with them. After clamping the blades and the metal grid, the tool body must be injected so that a positively-locked connection between the tool body and the metal grid results.

The blades in the tool body may be configured to not be replaceable. This allows the blades in the tool body to be more firmly fixed. In an embodiment in which the blades in the tool body are not replaceable, a single use of the tool is to be assumed, whereby single use of the tool means to use the tool until it is no longer suitable. Otherwise, if the blades are replaceable, each blade can, for example, be individually removed from the tool body, reground and re-installed in the tool body.

A further embodiment has a connecting element which connects the blades of a blade assembly to one another. This connecting element can be a bolt which is guided through a hole in the blades of a blade assembly. The bolt is positively-locked to the securing element. By the positively-locked connection between the securing element and the bolt, which belongs to the blade arrangement, there is a positively-locked connection between the securing element and the blade arrangement.

Mentioned optional features can be implemented in any combination as far as they are not mutually exclusive. In particular, where ranges are indicated, further ranges result from combinations of the minima and maxima mentioned.

Further advantages and features of the invention result from the following description of embodiment examples of the invention with reference to schematic representations.

BRIEF DESCRIPTION OF THE FIGURES

Embodiment examples of the invention are described below, by way of example, using the figures. The figures show schematic representations which are not true to scale.

DETAILED DESCRIPTION OF THE FIGURES

In the following, identical reference numbers stand for identical or functionally similar elements (in the different figures). An additional apostrophe can be used to distinguish between similar or functionally identical or functionally similar elements in a further embodiment.

Figure 1:
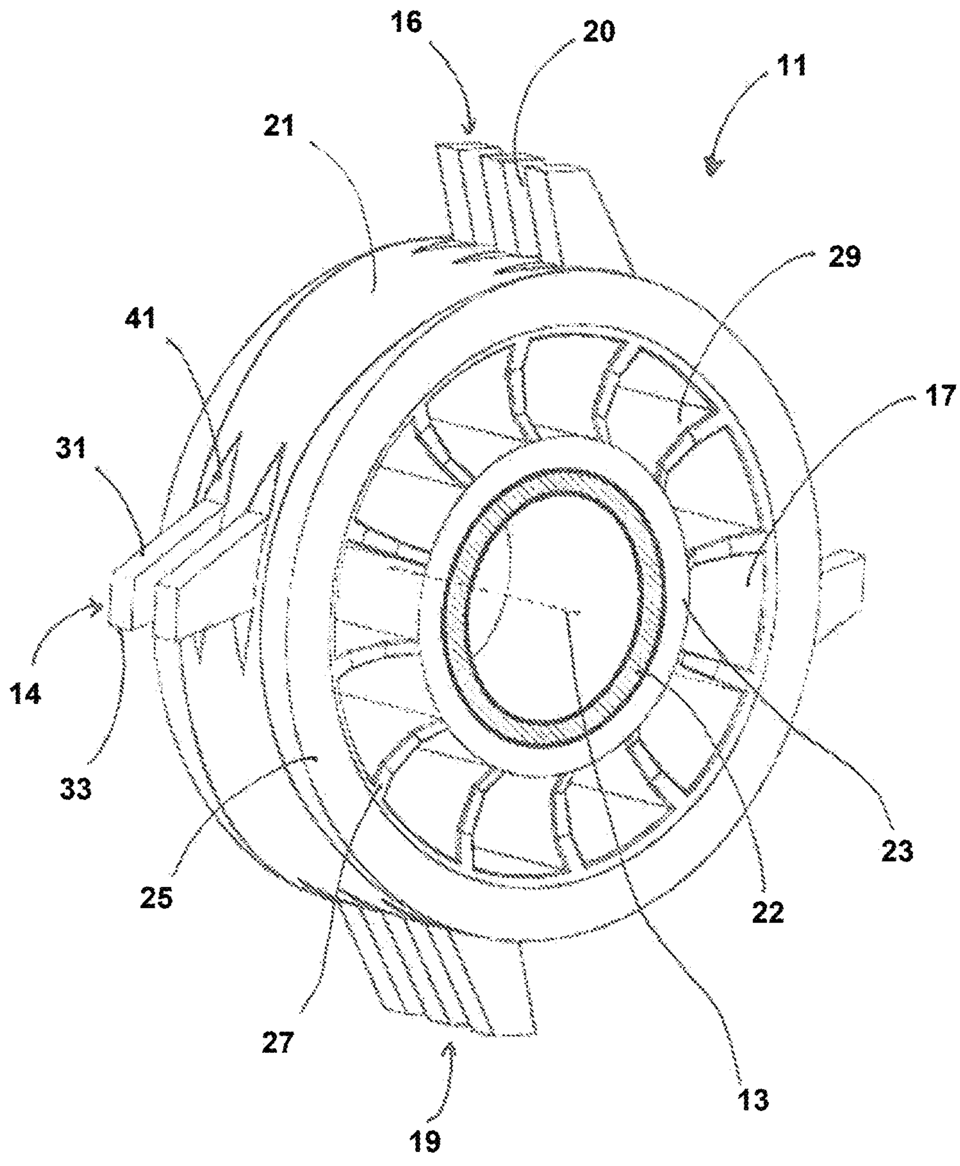
FIG. 1: Shows a three-dimensional representation of a first embodiment of a tool for rotary and cutting machining of workpieces with a tool body and a plurality of blade arrangements fixedly arranged on the tool body, which are secured by a common securing element.
Figure 3:
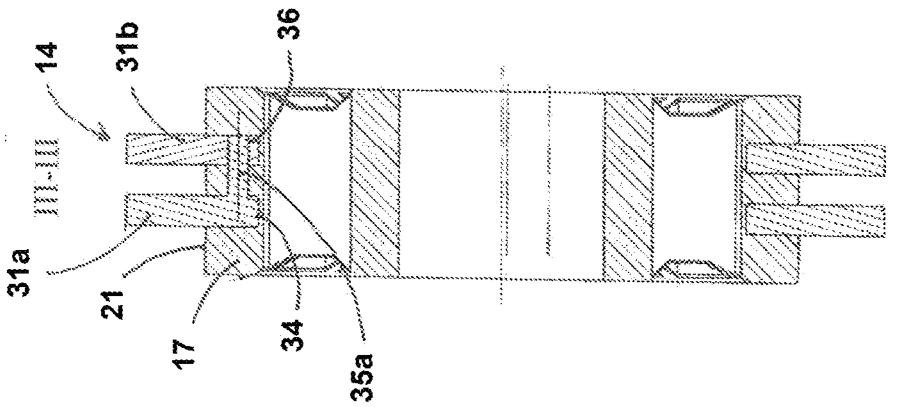
FIG. 3: Shows a cross-sectional view of the tool of FIG. 1 along the III-III line.
Figure 2:
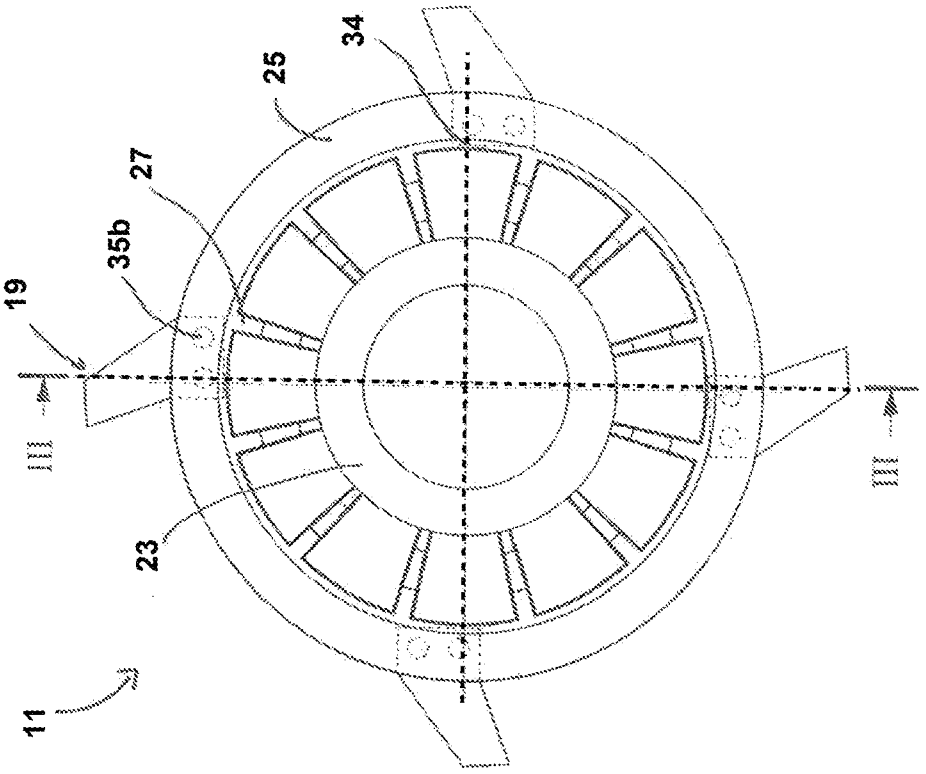
FIG. 2: Shows a top view of the tool of FIG. 1.

FIGS. 1 to 3 show a first embodiment of a tool 11 according to the invention for rotary and cutting machining of workpieces, which is produced of plastic. The tool 11 has a cylindrical tool body 17 with an inner ring 23 designed as a hub 15 for receiving a drive shaft (not shown in the figures) and an outer ring 25, which is connected to the inner ring 23 by a plurality of spokes 29. A total of four blade arrangements 14, 16 projecting radially from the tool body 17 are fixedly arranged on the outer ring 25. The blade arrangement 14 thereby comprises two blades 31 spaced apart from one another, and the blade arrangement 16 comprises three blades 31 spaced apart from one another. The distance between two adjacent blades corresponds to at least the thickness of one blade. The blade arrangements 14, 16 are arranged axially offset from each other on the tool body 17 in such a way that the blades of the blade arrangement 14 cover the gaps 20 existing between the blades of the blade arrangement 16. This enables the tool 11 to cover a certain working width corresponding to the width of the blade arrangement 16 and to machine it in operation. Advantageously, the width or respectively blade length of a single blade 31 corresponds at least to the distance between two adjacent blades.

Every two blade arrangements, 14 or respectively 16, are arranged opposite from one another, i.e., offset by 180 degrees, on the tool body 17. This prevents imbalances during operation. The blades of a blade arrangement 19 each have the same orientation in the direction of rotation.

The tool body has a hollow cylindrical structure with the cylinder axis coinciding with the axis of rotation 13. It comprises an inner ring integral with the hub 15 and the outer ring 25 connected to the inner ring by a plurality of radial ribs 29. The hub 15 comprises a metal sleeve 22 to which the inner ring 23 is molded.

The blade arrangements 14, 16 are alternatingly fixedly attached in the direction of rotation on the outer ring 25, wherein these are additionally secured by a securing element 21 in the form of a strip. In the embodiment example shown, the securing element 21 partially or preferably completely surrounds the tool body in its circumferential direction. The securing element can, in particular, be subjected to tensile stress and, in a preferred embodiment, is a layer of a fiber composite material with filament or continuous fibers. The filament or continuous fibers have at least the length of the tool circumference and are preferably arranged for the greater part in the circumferential direction, so that the securing element 21 can be subjected to maximum tensile stress. Said layer of fiber composite material may comprise a fiber fabric or fiber structure, wherein the greater portion of the fibers are arranged in the circumferential direction. Alternatively, the securing element 21 may be implemented by wrapping the tool body by a continuous fiber. Advantageously glass, aramid or carbon fibers can be used as fibers.

The tool body 17 has a lightweight construction and is made of a thermoplastic, which may be reinforced with short cut fibers. It is also conceivable that duroplast is used for the tool body.

The blades 31 are arranged on the tool body 17 in such a way that their cutting edges 33 lie on a common circumferential line running out from the axis of rotation 13 and this forms the outermost circumference of the tool 11. The cutting edges 33 of the blades 31 run parallel to the axis of rotation 13.

Figure 4:
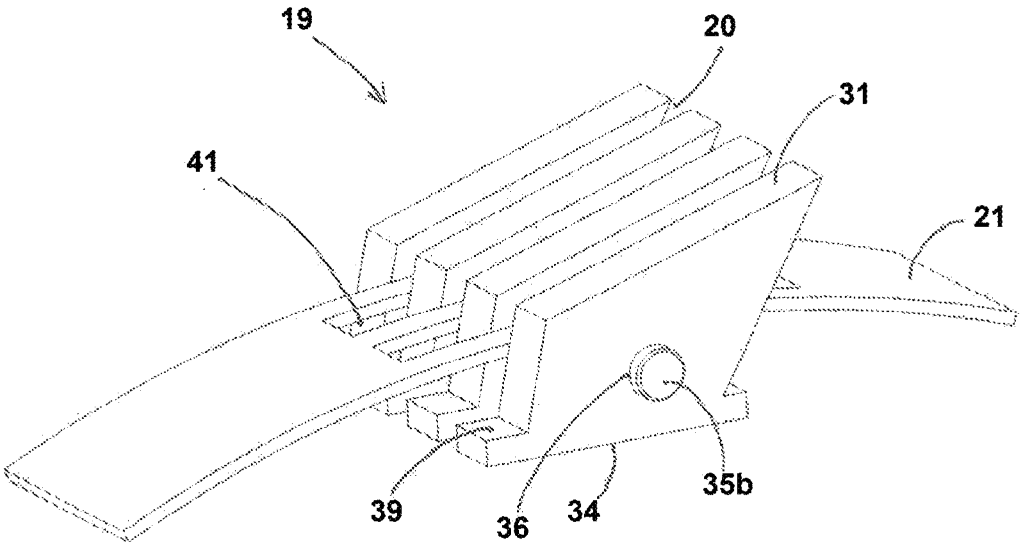
FIG. 4: Shows a perspective view of a single blade arrangement consisting of a plurality of blades that are spaced apart, which are connected to one another by a bolt, and of the securing element, which is guided between the blades above the bolt.

An embodiment of the attachment of the blades 31 to the tool body 17 is shown in more detail in FIG. 3. A vertically projecting bolt 35*a* is provided at a distance from the lower edge 34 of the metal blade 31*a* of the blade arrangement 14, which bolt engages in a hole 36 at the same height in the adjacent blade 31*b*. In addition, the blades have projections 39 at the base, which allow a good anchoring in the tool body (FIG. 4). Both the bolt connection and the projections are positively-anchored in the outer ring. This prevents them from disengaging from the tool body during operation at high speeds. According to one embodiment, the blades 31 are completely overmolded with the projections 39 and the bolt connecting them.

The securing element 21 surrounds the tool body 17 in the circumferential direction and defines an outer layer which is integral with the outer ring 25. The upper part of the blades 31 thereby protrudes radially from the outer ring 25 or respectively from the securing element 21. As can be seen from FIG. 1, the securing element 21 has recesses 41 in the form of slots at those points where the blades 31 are arranged. These slots have a size that makes it impossible for the blades 31 with the extended base part to move through these slots (FIG. 1). Therefore, should the tool body 17 shatter during operation due to a material defect, the blades 31 are still held in place by the securing element 21. On the other side, the securing element 21 gives the tool body 17 great stability and rigidity, so that the tool body 17 cannot shatter at all under normal circumstances.

The blade arrangement 19 with a total of four blades is shown in FIG. 4. These blades have a hole 36 at a distance from the lower edge 34, which serves to receive a bolt 35*b*. In turn, the securing element 21 has recesses 41 through which the blades extend. In this embodiment of the securing element 21, the length of the recesses 41 in the securing element 21 may exceed that of the projection 39 of the blades 31, as long as a positively-locked connection between the bolt 35*b* and the securing element 21 is ensured.

Figure 5:
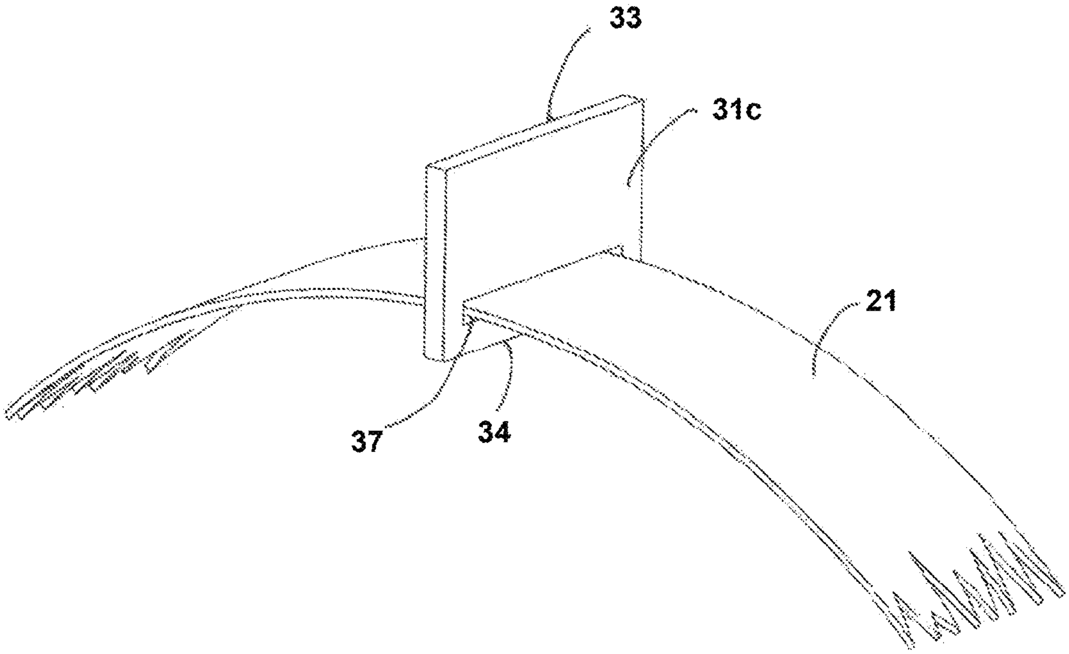
FIG. 5: Shows an embodiment of a single metal blade with a recess in the form of a slot through which the securing element is guided.

Another example for attaching a securing element 21 to a blade 31*c* is shown in FIG. 5. The blade 31*c* has a recess in the form of a slot 37 opposite and parallel to the cutting edge 33, and the securing element 21 is guided through this recess. This provides a positively-locked connection between the blade 31 and the securing element 21 embedded in the outer ring 25.

Figure 6:
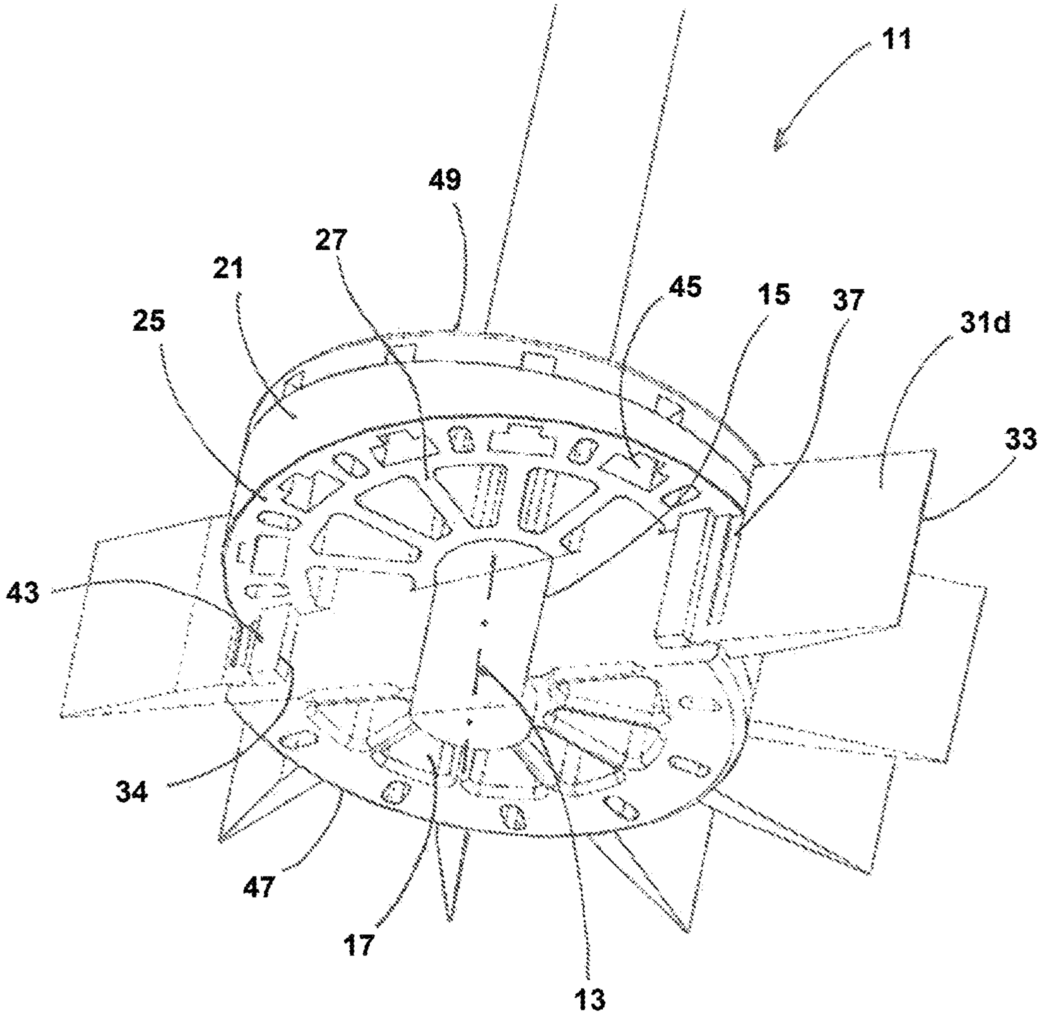
FIG. 6: Shows a second embodiment of a rotary cutting tool with a plurality of blades projecting radially from the tool body, wherein the tool body is shown in a partial cross-sectional view for illustration purposes.

Another embodiment of a rotary cutting tool 11 is shown in FIG. 6. The structure of the tool body 17 is fundamentally the same as in the first embodiment, however, with the difference that blades 31*d* of a different shape are used and the cutting edges are formed along the broad side of the cutting plates. On the side of the blade 34 opposite the cutting edge 33, a step-shaped widening 43 is provided perpendicular to the plane of the plate in both directions of the metal blade 31, so that the widening projects beyond the thickness of the metal blade 31. Recesses 45 corresponding to this widening of the blades 31 are provided in the outer ring 25 of the tool body 17, into which recesses the blades can be inserted in the axial direction. This provides a positively-locked connection between the tool body 17 and the blades 31. Slots 37 are also provided parallel to the cutting edges 33 at a short distance from the widening 43. On the one hand, a part of the tool body 17 and on the other hand, the securing element 21 can engage in these slots 37 to create a positively-locked connection. The securing element 21 is limited in its extension in the direction of the axis of rotation by the length of the slot 37 of the metal blade 31.

Figure 7:
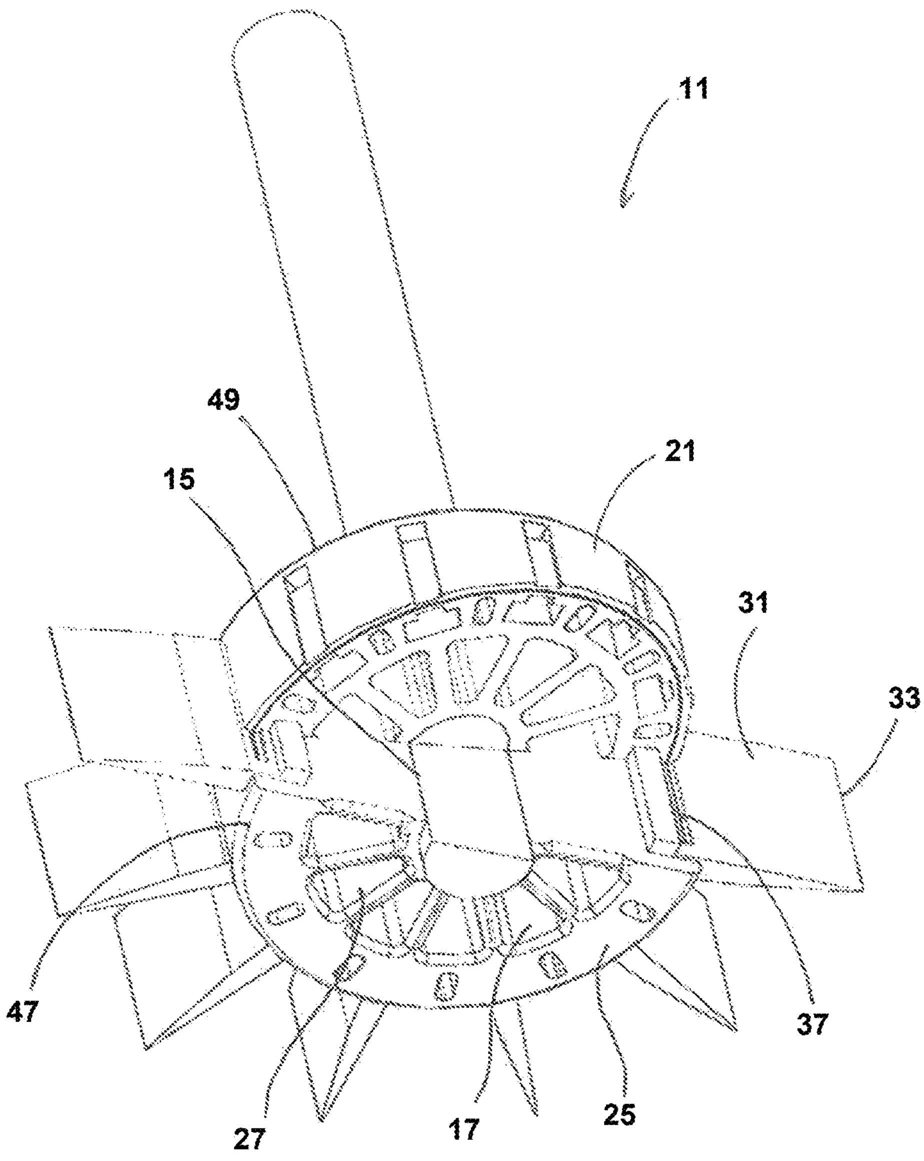
FIG. 7: Shows the same embodiment example as in FIG. 6, with the difference being that the securing element also encloses the tool body in its width.

An embodiment example of a rotary cutting tool which solely differs from the embodiment example in FIG. 6 because of the securing element 21 is shown in FIG. 7. In this example, the securing element 21 is also passed through the slots 37 of the blades 31 together with a part of the tool body 17. However, the securing element 21 projects beyond the slot 37 of the blades 31 in the direction of the axis of rotation and encloses the tool body 17 both in the circumferential direction and in its axial direction from the lower edge 47 to the upper edge 49 of the tool. The securing element 21 has an extension in the radial direction at the points where no blades 31 are provided, so that the thickness of the securing element 21 at these points is approximately twice as great as at those points where the securing element 21 is guided through the slot 37 of the blades 31.

Figure 8:
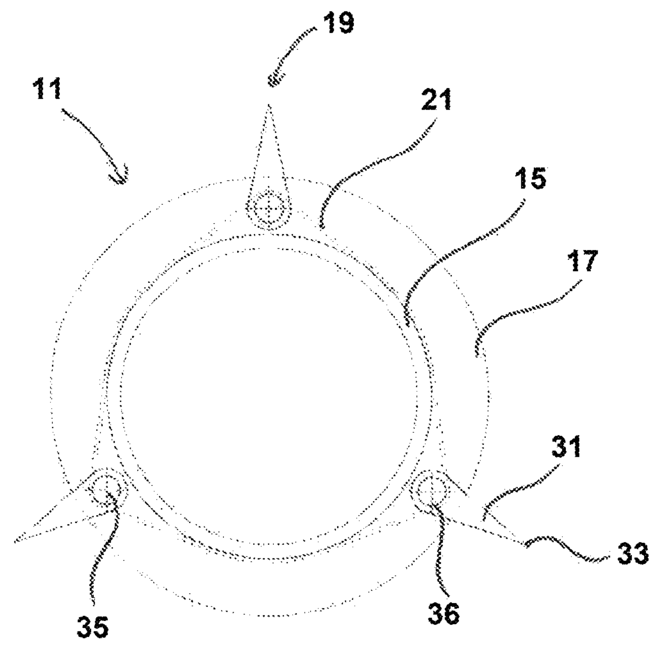
FIG. 8: Shows a top view of a tool with a securing element fitted on the tool.

A further embodiment of the tool 11 is shown in FIG. 8. Here, the securing element 21 is guided in the form of a strip within the tool body 17. Both the blades 31, as well as the blade arrangement 19 have a positively-locked connection with the tool body 17. The blades 31 comprise a hole 36, which is provided at the base of the blade 31. A bolt 35 is guided through this hole 36, so that the blades 31 are connected via a bolt 35 and create a blade arrangement 19. The blade arrangements 19 are arranged in such a way that the distance between them is always at its maximum. This ensures an even load and weight distribution in the tool 11 and prevents the occurrence of imbalance during operation. The securing element 21 encloses a part of the blade arrangement 19. In this embodiment, the securing element 21 encloses the bolt 35 of the blade arrangement 19. In so doing, the bolt 35 forms that part of the blade arrangement 19 which is enclosed by the securing element.

It is also possible that with a greater number of blade arrangements 19, several securing elements 21 are used. In so doing, it is not necessary that each securing element 21 comprises all blade arrangements 19. For example, in the case of a tool 11 with four blade arrangements 19, two securing elements 21 can be fitted, which in each case comprise only the two oppositely arranged blade arrangements 19, so that all blade arrangements 19 are secured by at least one securing element 21.

Furthermore, it is conceivable that the blade 31 has a two-part structure. In this case, the projection 39 of a blade 31 may be designed as a separate component. The projection 39 of the blade is positively locked to the tool body 17. By a further positively-locked connection between the projection 39 of the blade 31 and the remaining component of the blade 31, there is a positively-locked connection between the entire blade 31 and the tool body 17.

Figure 9:
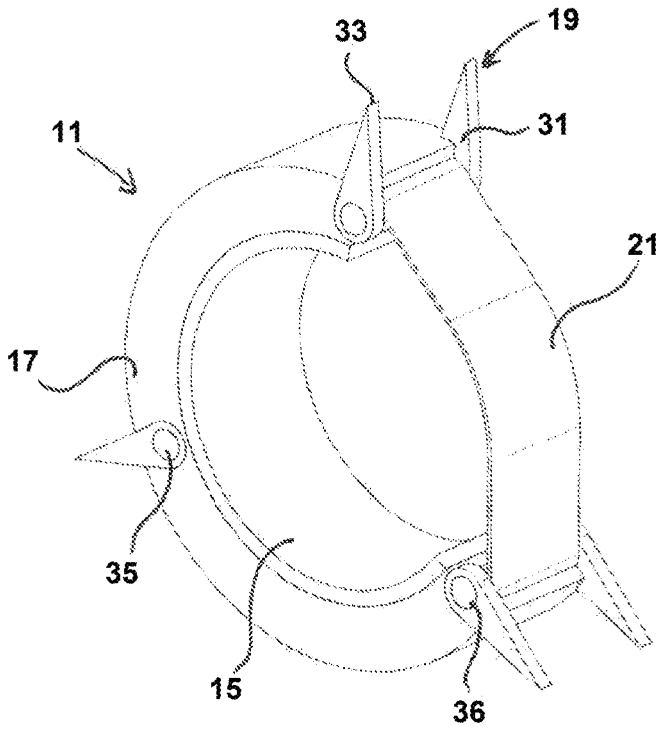
FIG. 9: Shows a three-dimensional cross-sectional view of a tool with a securing element fitted in the tool, wherein the securing element is fully shown.

A three-dimensional view of a tool 11 is shown in FIG. 9, in which one third of the tool body 17 is not shown, wherein the securing element 21 is shown in its entirety. In FIG. 9, it can be seen how the securing element 21 is arranged in the tool body 17 and comprises the bolts 35 of the blade arrangements 19. In this embodiment, the hub 15 forms the innermost area of the tool 11. The shape of the securing element 21 is selected in such a way that the securing element 21 covers the shortest possible distance from one blade arrangement to the other blade arrangement, wherein it always comes to rest outside the hub 15.

The newly invented tool according to the first embodiment of FIG. 1 to FIG. 3 is manufactured as follows:

The tool body 17 is produced of plastic using an injection molding process. Before the tool body 17 is manufactured, the blades 31 are clamped in a fixture. The blades 31*a* are placed in the fixture in such a way that within the fixture they assume the final position which they will have in the tool 11 after manufacture. In this embodiment, one blade 31 has a vertically projecting bolt 35 that engages through a hole 36 in the adjacent blade 31*b* to hold the blade assembly 19 together. During injection molding of the tool body 17, the latter encloses the lower part of the blade assembly including the bolt connection and results in a positively-locked connection between the blades 31 and the tool body 17. The tool body 17 is injection molded into the respective desired shape and does not require any further post-molding finishing. The securing element 21 in the form of a strip of fiber composite material can be applied in different ways. It can consist of fiber fabrics bound in polymer or unidirectionally-oriented fibers. The securing element 21 in the form of a fiber composite material is attached around the tool body 17 in the circumferential direction. In so doing, it is applied around the blades 31 in such a way that recesses 41 in the form of slots are formed at points where blades 31 are located. For the creation of the connection between the securing element 21 and the tool body 17, use is made of the existence of both components produced of plastic. Both components are heated to the temperature at which the one generates a bonding agent for the other, thereby creating a material connection between the components. In the embodiment example, a securing element 21 is shown which is applied to the tool body 17 so that recesses 41 in the securing element come to be in places where blades 31 are located. It is likewise conceivable that the securing element 21 is manufactured with these recesses 41 in the form of slots and is then applied to the tool body 17. In such an embodiment, the securing element 21 consists of several pieces which are firmly bonded on the tool as well as between each other and to the tool body 17 by means of the melting process.

Instead of a fiber composite material for the securing element 21, a continuous fiber alone can also be provided. This is wound around the tool body 17 with the blades 31 already attached in the circumferential direction. This also creates a positively-locked connection between the continuous fiber and the blades 31. However, for the creation of a positively-locked connection between the continuous fiber and the tool body 17, the tool body 17 must be once again heated to such an extent that it can form a bond with the continuous fibers by way of a melting process.

In the production of the second embodiment of FIG. 6 and FIG. 7, the application of the securing element 21 differs in that the blades 31 have slots 37 through which the securing element 21 is placed. The tool body 17 is again molded on in such a way that it forms a positively-locked connection with the pre-positioned clamped blades 31. This is achieved both by the slots 37 in the blades and by the widening 43 arranged at the base of the blades. The securing element 21 comes through the slots 37 of the blades and to rest on the tool body 21 in the circumferential direction. By heating both components to a certain material-specific temperature, the melting process is initiated, whereby a material-locking connection is created between the securing element 21 and the tool body 17.

In the manufacture of the embodiment of FIG. 8 and FIG. 9, the securing element 21 again has a positively-locked connection to the blade arrangements 19 prior to the manufacture of the tool body 17. As in the previous methods, the tool body is manufactured in an injection molding process and creates a positively-locked connection with both the securing element 21 and the blade arrangements 19. It is also conceivable in this embodiment, that several securing elements 21 are arranged in the tool body 17, wherein each blade arrangement 19 is secured by at least one securing element 21. In this case, the blade arrangements 19 are partially enclosed by the securing element 21, such that the securing element 21 encloses a portion of the blade arrangement 19.

Whereas specific embodiments have been described here above, it is apparent that various combinations of the embodiments shown may be used, insofar as the embodiments are not mutually exclusive.

The invention claimed is:

1. A tool for the rotary and cutting machining of workpieces, comprising:

a plastic tool body;

a plurality of blades partially each at least partially inserted into a respective slot in the plastic tool body and arranged in blade arrangements; each of the plurality of blades positively-locked within the respective slot of the plastic tool body; and a securing element circumferentially extending around the tool body and defining a plurality of openings through which the plurality of blades extend, the securing element securing the plurality of blades to the tool body to prevent the plurality of blades from detaching from lateral movement relative to the tool body during operation, the securing element comprising a securing strip extending around an outer surface of the tool body and at least partially surrounding each of the plurality of blades.

2. The tool of claim 1, wherein the securing strip surrounds the tool body in a circumferential direction.

3. The tool of claim 2, wherein the securing strip comprises a fiber composite material with a fiber content of at least 10% and the fiber comprises at least one of glass, aramid or carbon fibers.

4. The tool of claim 3, wherein fibers in the securing element comprise at least one continuous fiber.

5. The tool of claim 4, wherein the securing element is formed by wrapping the tool body with the at least one continuous fiber.

6. The tool of claim 5, wherein a winding direction of the at least one continuous fiber is parallel to a broadside of the plurality of blades.

7. The tool of claim 3, wherein the fiber composite material comprises unidirectional fibers and is arranged such that the unidirectional fibers are oriented in a circumferential direction of the tool.

8. The tool of claim 2, wherein the securing strip comprises a fiber composite material comprising an organic sheet.

9. The tool of claim 1, wherein the plurality of blades each have a slot through which the securing element is guided.

10. The tool of claim 1, wherein the blades are attached to the tool body by injection molding of the tool body.

11. The tool of claim 1, wherein the tool body comprises an inner ring and an outer ring, the inner ring and the outer ring connected to each other by a plurality of ribs.

12. The tool of claim 11, wherein the inner ring forms a hub.

13. The tool of claim 11, wherein the inner ring, the outer ring and the plurality of ribs in the tool body all have substantially a same wall thickness.

14. The tool of claim 11, wherein the plurality of ribs in the tool body are each oriented radially.

15. The tool of claim 1, wherein the securing element is firmly bonded to the tool body.

16. The tool of claim 1, wherein the securing element comprises a metal grid.

17. The tool of claim 1, wherein the plurality of blades in the tool body are not replaceable.

18. The tool of claim 1, further comprising a bolt inserted through a hole in the plurality of blades of the blade arrangement, the bolt positively locked to the securing element.

* * * * *